United States Patent
Choi et al.

(10) Patent No.: US 8,331,968 B2
(45) Date of Patent: Dec. 11, 2012

(54) METHOD OF TRANSMITTING A ANTENNA CONTROL SIGNAL

(75) Inventors: Jin Soo Choi, Gyeonggi-do (KR); Jae Hoon Chung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 12/672,493

(22) PCT Filed: Oct. 24, 2008

(86) PCT No.: PCT/KR2008/006303
§ 371 (c)(1),
(2), (4) Date: Feb. 5, 2010

(87) PCT Pub. No.: WO2009/054700
PCT Pub. Date: Apr. 30, 2009

(65) Prior Publication Data
US 2012/0142385 A1   Jun. 7, 2012

Related U.S. Application Data (60) Provisional application No. 60/982,732, filed on Oct. 26, 2007.

(30) Foreign Application Priority Data

Oct. 24, 2008   (KR) .................. 10-2008-0104648

(51) Int. Cl.
*H04B 7/00* (2006.01)
(52) U.S. Cl. ...... 455/509; 455/561; 455/101; 455/562.1

(58) Field of Classification Search ............... 455/562.1, 455/272, 423, 436, 561, 274, 277.1, 427, 455/101, 509; 370/208, 210, 480, 248, 252
See application file for complete search history.

(56) References Cited

U.S. PATENT DOCUMENTS

| | | | |
|---|---|---|---|
| 2006/0111054 A1* | 5/2006 | Pan et al. | 455/101 |
| 2008/0112309 A1* | 5/2008 | Hamaguchi et al. | 370/208 |
| 2010/0069122 A1* | 3/2010 | Ito | 455/562.1 |
| 2012/0134279 A1* | 5/2012 | Tamaki | 370/248 |

FOREIGN PATENT DOCUMENTS

| | | |
|---|---|---|
| CN | 1337838 | 2/2002 |
| CN | 1488206 | 4/2004 |
| CN | 1765064 | 4/2006 |
| EP | 1175022 | 1/2002 |
| WO | 01-76110 | 10/2001 |
| WO | 2004-049613 | 6/2004 |
| WO | 2005-069505 | 7/2005 |

* cited by examiner

*Primary Examiner* — Sujatha Sharma
(74) *Attorney, Agent, or Firm* — Lee, Hong, Degerman, Kang & Waimey (57) ABSTRACT

An antenna switching method in a wireless access system is disclosed. A method of transmitting antenna information according to one embodiment of the present invention includes the steps of receiving an uplink request message for closed-loop antenna switching from a mobile station, transmitting a reference field including prescribed modulation and coding scheme (MCS) information to the mobile station, and transmitting a differential field including the antenna information to the mobile station. In this case, the antenna information can contain a selected antenna index.

12 Claims, 8 Drawing Sheets

METHOD OF TRANSMITTING A ANTENNA CONTROL SIGNAL

CROSS-REFERENCE TO RELATED APPLICATIONS

This application is the National Stage filing under 35 U.S.C. §371 of International Application No. PCT/KR2008/006303, filed on Oct. 24, 2008, which claims the benefit of earlier filing date and right of priority to Korean Application No. 10-2008-0104648, filed on Oct. 24, 2008, and also claims the benefit of U.S. Provisional Application Ser. No. 60/982,732, filed on Oct. 26, 2007.

TECHNICAL FIELD

The present invention relates to an antenna switching method in a wireless access system. And, the present invention relates to a method of transmitting an index of a selected antenna in an uplink antenna switching system.

BACKGROUND ART

In the following description, an antenna selection information generating method and a signal transmitting method for the same are disclosed.

Figure 1:
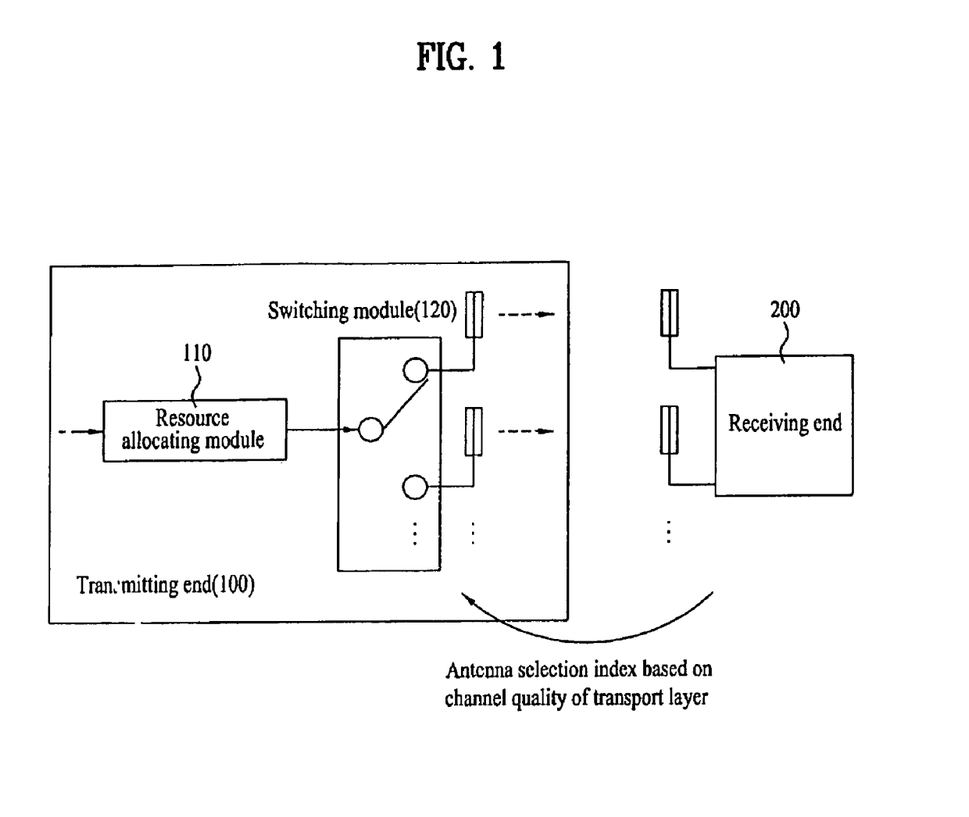
FIG. 1 is a diagram of a structure of a general closed loop antenna switching system.

FIG. 1 is a diagram of a structure of a general closed loop antenna switching system.

In every system that transmits and receives signals using a plurality of transmitting and receiving antennas, the structure, as shown in FIG. 1, uses the small number of RF chains for transmission by switching the transmitting antennas.

In particular, in an uplink closed loop antenna switching system, a transmitting end has the structure that operates in a manner of sequentially (or randomly or by giving a predetermined weight to a period of an antenna to use) selecting an antenna for transmitting data and then transmitting the data and a sounding reference signal (hereinafter abbreviated 'SRS').

In a configuration of a transmitting end 100 shown in FIG. 1, a resource allocating module 110 plays a role in determining a frequency, time or space (antenna) for carrying a packet. And, a switching module 120 sequentially (or randomly) selects an antennas to transmit the packet received from the resource allocating module 110 in performing each transmission. In this case, a plurality of transmitting antennas can exist and the number of RF chains can amount to the maximum number of the transmitting antennas.

Meanwhile, a receiving end 200 measures a channel quality of a transport layer using the received reference signal and then feeds back the measured channel quality. Therefore, as mentioned in the above description, the switching module 120 will be able to perform antenna switching based on the fed-back channel quality.

The object of the closed loop antenna switching system shown in FIG. 1 is to obtain spatial diversity by transmitting data using transmitting antennas alternately in a configuration difficult to have numerous transmitting RF chains (e.g., a terminal has difficulty in having a great number of RF chains in case of an uplink system).

DISCLOSURE OF THE INVENTION

Technical Problem

Figure 2:
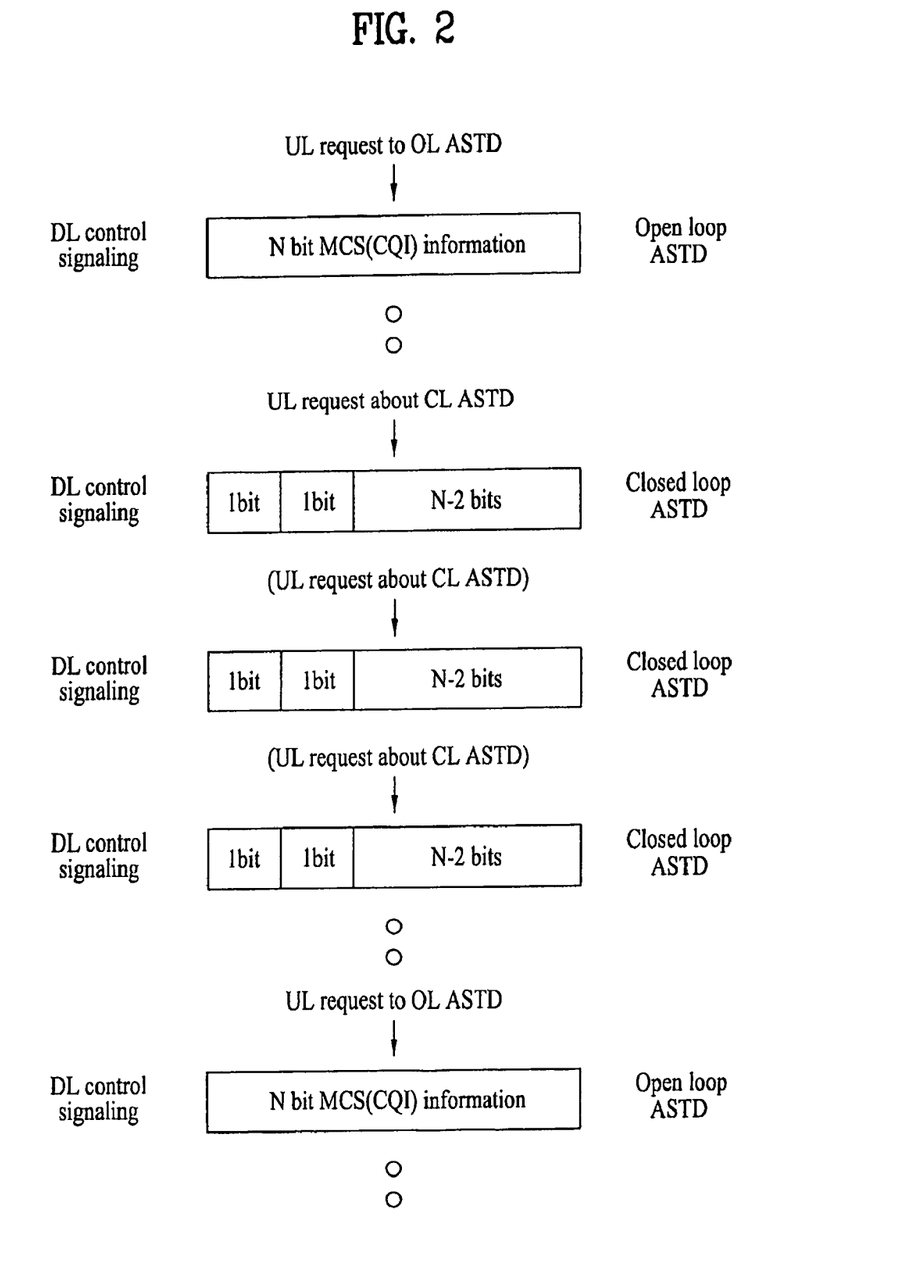
FIG. 2 is a diagram for an example of an antenna index transmitting method in an adaptive open-loop and closed-loop antenna switching system.

FIG. 2 is a diagram for an example of an antenna index transmitting method in an adaptive open-loop and closed-loop antenna switching system.

In case that open loop (OP) and closed loop (CL) antenna switching is adaptively applied according to a configuration of a user equipment (hereinafter abbreviated UE), FIG. 2 shows a method that a base station transmits a selected antenna index to a terminal using a downlink (hereinafter abbreviated DL) control signal.

First of all, if a base station receives an uplink (UL) request for OL ASTD (antenna switching transmit diversity) from a terminal, the base station is able to transmit modulation and coding scheme (MCS) information of prescribed bits (N bits) to the terminal using a downlink control signal.

If the base station receives an uplink request for CL ASTD from the terminal, the base station is able to transmit a downlink control signal containing a selected antenna index, a presence or non-presence of increment of the antenna index and an incremented/decremented offset value of prescribed bits (N-2 bits).

The base station is able to change CL ASTD adaptively in the course of performing communication with the terminal. The base station is able to transmit a DL control signal to inform the terminal of the information on the changed value. The DL control signal transmitted to the terminal by the base station can be transmitted in a manner that the base station randomly selects a downlink antenna. And, the DL control signal can be transmitted to the terminal by triggering according to a request made by the terminal. If the base station receives an uplink request for OL ASTD, the base station is able to transmit MCS information of prescribed bits (N bits) to the terminal.

Figure 3:
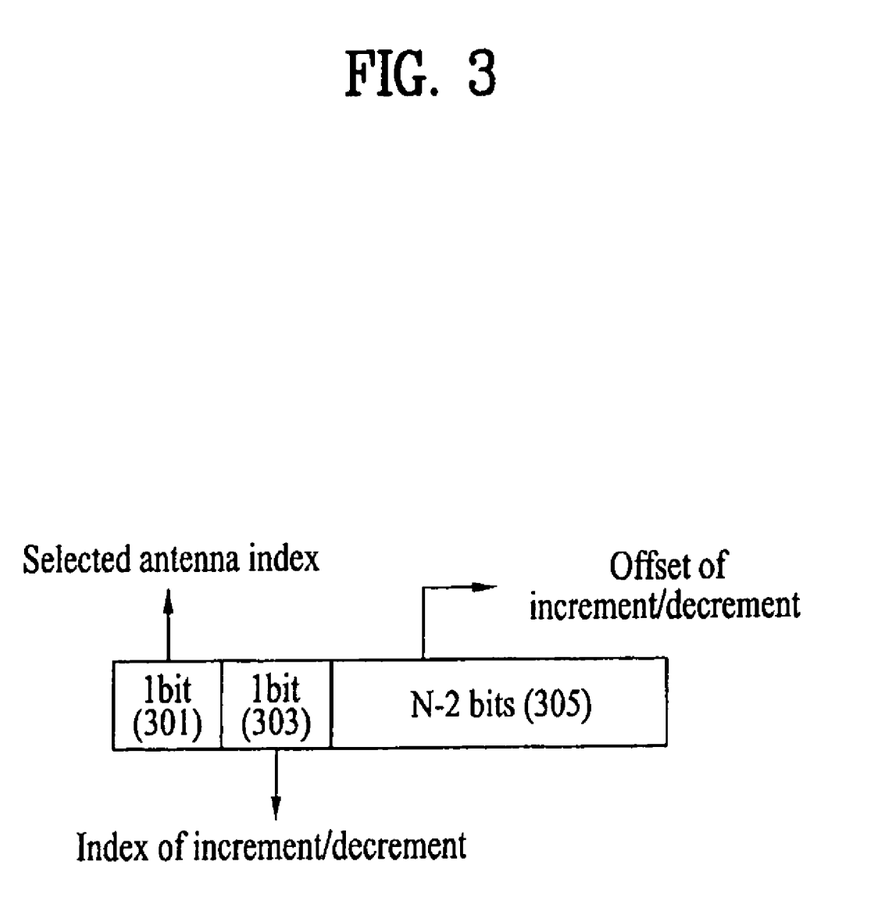
FIG. 3 is a diagram for an example of a downlink control signal containing an antenna index.

FIG. 3 is a diagram for an example of a downlink control signal containing an antenna index.

Referring to FIG. 3, a downlink control signal (DL control signaling) can include a bit 301 indicating a selected antenna index, a bit 303 indicating a presence or non-presence of increment/decrement of MCS level, and an increment/decrement offset bit 305 indicating an offset value for an incremented/decremented amount of the MCS level.

In case that a base station does not transmit an antenna index to a terminal in OL ASTD, a downlink control signal is able to represent MCS (CQI) information as N bit(s). In particular, a downlink signal can represent MCS information in size of N bit(s) in case that an antenna index is not transmitted to a terminal.

If a base station transmits an antenna index to a terminal in CL ASTD, it is able to represent an index of a selected antenna as at least one or more bits. If there are two transmitting antennas, it is able to identify the antennas using '0' and '1', respectively. If there are at least three or more antennas, it is able to identify an index of each of the antennas using two bits.

Moreover, the downlink control signal can further include a bit indicating whether a next MCS value is incremented or decremented. For instance, if a next MCS value is incremented, it is represented as '0'. If a next MCS value is decremented, it is represented as '1'. Besides, the downlink control signal can further include an offset value indicating an incremented/decremented amount of the next MCS value.

Referring to FIG. 2, it can be observed that MCS information field (or, CQI information field), which is transmitted to the terminal by the base station, is adaptively applied to differ according to an uplink request for instructing switching of on-loop (OL) and closed-loop (CL) antennas. In particular, in case of the OL antenna switching, a conventional N-bit MCS field is used. In case of the CL antenna switching, it is able to use an MCS field shown in FIG. 3.

The structure of the downlink control signal shown in FIG. 2 and FIG. 3 includes an antenna index provided within a downlink MCS information field for the CL antenna switching. Therefore, the base station is able to inform the terminal of a difference value from a previously transmitted MCS (or CQI) level. In this case, the previously transmitted MCS (or CQI) level becomes the information the base station has transmitted to the terminal in case of the OL antenna switching.

However, since the OL antenna switching is applicable if a mobile speed of the terminal is high, the accuracy of the MCS (or CQI) information, which is transmitted to the moving-fast terminal, can be considerably reduced. Hence, in case of performing the CL antenna switching using the difference value from the inaccurate MCS (or CQI) information, the MCS (or CQI) information transmitted to the terminal may be degraded in accuracy as well.

Technical Solution

Accordingly, the present invention is directed to an antenna switching method in a wireless access system that substantially obviates one or more of the problems due to limitations and disadvantages of the related art.

An object of the present invention is to provide a communication system, by which efficiency of the communication system can be secured.

Another object of the present invention is to provide an enhanced method of transmitting a downlink control signal, by which an antenna index can be included in the downlink control signal in performing adaptive closed-loop antenna switching.

A further object of the present invention is to provide an MCS or CQI information transmitting method, by which the MCS or CQI information can be reliably transmitted in an adaptive closed-loop antenna system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting antenna information according to one embodiment of the present invention includes the steps of receiving an uplink request message for closed-loop antenna switching from a mobile station, transmitting a reference field including prescribed modulation and coding scheme (MCS) information to the mobile station, and transmitting a differential field including the antenna information to the mobile station, wherein the antenna information contains a selected antenna index.

According to one embodiment of the present invention, preferably, the reference field is transmitted before the differential field is transmitted. More preferably, the reference field includes modulation and coding scheme (MCS) information in case of using open-loop antenna switching and the differential field includes a field indicating a presence or non-presence of increment/decrement of the MCS information and an offset value for increment/decrement of the MCS level.

According to one embodiment of the present invention, the reference field is periodically transmitted. In this case, the antenna information contains the selected antenna index. And, the differential field is transmitted each time the MCS information is updated.

To further achieve these and other advantages and in accordance with the purpose of the present invention, a method of receiving antenna information according to another embodiment of the present invention includes the steps of transmitting an uplink request message for closed-loop antenna switching to a base station, receiving a reference field including prescribed modulation and coding scheme (MCS) information from the base station, and receiving a differential field including the antenna information from the base station, wherein the antenna information contains a selected antenna index.

According to another embodiment of the present invention, preferably, the reference field is transmitted before the differential field is transmitted. More preferably, the reference field includes modulation and coding scheme (MCS) information in case of using open-loop antenna switching and the differential field includes a field indicating a presence or non-presence of increment/decrement of the MCS information and an offset value for increment/decrement of the MCS level.

According to another embodiment of the present invention, the reference field is periodically transmitted. In this case, the antenna information contains the selected antenna index. And, the differential field is transmitted each time the MCS information is updated.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the embodiments of the communication can perform communications efficiently.

Secondly, it is able to efficiently transmit an antenna index using adaptive closed loop antenna switching.

Thirdly, it is able to transmit reliable MCS information or CQI information in an adaptive closed loop antenna system.

Fourthly, it is able to compensate for the performance degradation of a closed loop antenna switching method, which may occur in case that MCS or CQI information as a reference of a generally used method is inaccurate.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

First of all, the present invention relates to a wireless access system. Embodiments of the present invention disclose methods of transmitting an index of a selected antenna in an uplink antenna switching system using a downlink control signal.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of the invention, a procedure or step, which may cause vagueness of the point of the present invention, is not described as well as a procedure or step understandable on the level of those skilled in the art.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, various operations performed for communication with a terminal can be performed by a base station or other networks except the base station. In this case, 'base station' can be replaced by such a terminology as a fixed station, a Node B, an eNode B (eNB), an access point and the like. And, 'mobile station (MS)' can be replaced by such a terminology as a user equipment (UE), a subscriber station (SS), a mobile subscriber station (MSS)', a mobile terminal and the like.

A terminal end means a node for transmitting data or audio service, and a receiving end means a node for receiving the data or audio service. Therefore, a terminal becomes a transmitting end and a base station becomes a transmitting end, in uplink. Likewise, a terminal becomes a receiving end and a base station becomes a receiving end, in downlink.

Meanwhile, a mobile terminal of the present invention can include a PDA (personal digital assistant), a cellular phone, a PCS (personal communication service) phone, a GSM (global system for mobile) phone, a WCDMA (wideband CMDA) phone, an MBS (mobile broadband system) phone or the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs 9 digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Embodiments of the present invention are supportable by the standard documents disclosed for at least one of the wireless access systems including IEEE 802 system, 3GPP system, 3GPP LTE system and 3GPP2 system. In particular, the omitted steps or parts of embodiments of the present invention can be supported by theses documents to clear the technical idea of the present invention. Moreover, all terminologies in this disclosure are understandable via the above standard documents.

Specifically, embodiments of the present invention are supportable by at least one of the standard documents of IEEE 802.16 system, which include P802.16-2004, P802.16e-2005 and P802.16Rev2 documents. And, embodiments of the present invention are supportable by at least one of the standard documents of 3GPP LTE system, which include 3GPP TS 36.211, TS 36.212, TS 36.213 and 3GPP TS 36.331 and the like.

In the following description, specific terminologies are provided to help the understanding of the present invention. And, the use of the specific terminology can be modified into another form within the scope of the technical idea of the present invention.

In embodiments of the present invention, an MCS (or CQI) field used for the conventional OL antenna switching shall be named a reference field and another MCS (or CQI) field used for the CL antenna switching shall be named a differential field.

Figure 4:
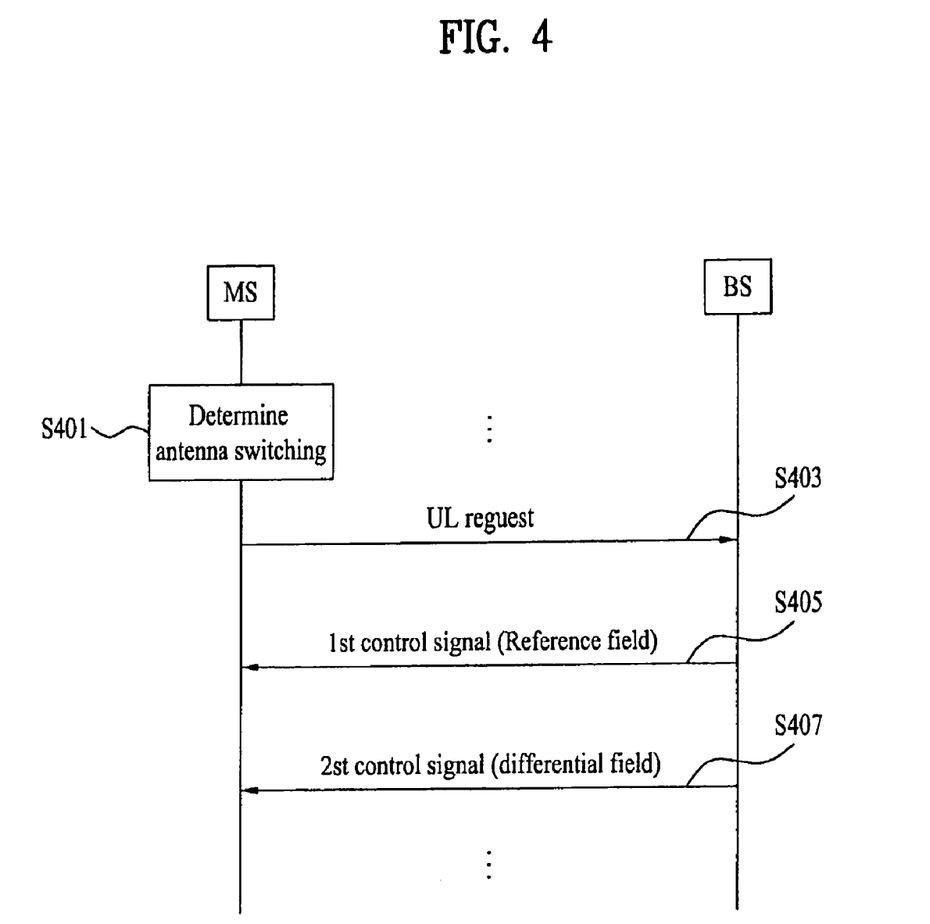
FIG. 4 is a diagram of one example for a method of transmitting an antenna index according to one embodiment of the present invention.

FIG. 4 is a diagram of one example for a method of transmitting an antenna index according to one embodiment of the present invention.

Referring to FIG. 4, a mobile station (MS) is able to determine whether to perform switching of an antenna based on a current channel environment and the like [S401].

If the mobile terminal (MS) needs to switch an antenna, the mobile station is able to transmit a UL request message for requesting an antenna switching to a base station (BS). In this case, the UL request message can include an antenna switching request for open-loop (OL) or closed-loop (CL) ASTD [S403].

When the base station performs CL antenna switching in the course of performing OL antenna switching, instead of transmitting a differential field to the mobile station directly, the base station transmits a reference field to the mobile station and is then able to transmit a differential field to the mobile station. Hence, the base station transmits a first control signal including the reference field to the mobile station

[S405] and is then able to transmit a second control signal including the differential field to the mobile station [S407].

The reference field of the first control signal can include previous MCS level information and the differential field of the second control signal can include a selected antenna index and modified MCS level information. In case that the base station (BS) determines whether to perform the antenna switching, it is able to omit the steps S401 to S403.

Figure 5:
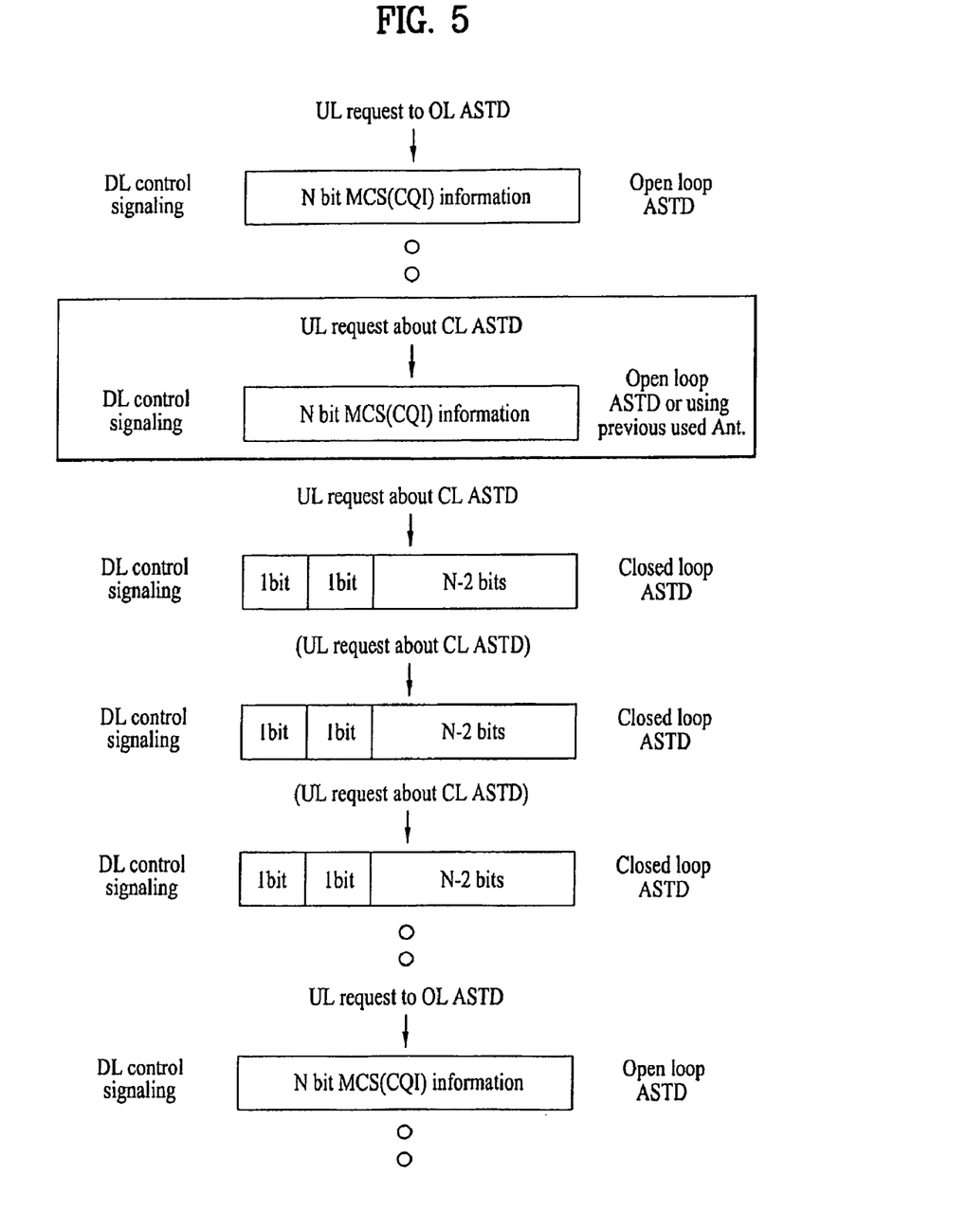
FIG. 5 is a diagram of another example for a method of transmitting an antenna index according to one embodiment of the present invention.

FIG. 5 is a diagram of another example for a method of transmitting an antenna index according to one embodiment of the present invention.

FIG. 5 shows an embodiment for the method described with reference to FIG. 4. A mobile station makes a request for antenna switching via an uplink request message. A base station is able to transmit a selected antenna index and MCS level information to the mobile station using a downlink control signal.

Referring to FIG. 5, a mobile station is able to send a UL request message for OL ASTD and/or CL ASTD to a base station whenever antenna switching is needed. When the base station switches to CL antenna switching in the course of performing OL antenna switching, the base station does not directly transmit a downlink control signal containing a differential field to the mobile station. In case of switching to the CL antenna switching, the base station transmits a downlink control signal containing a reference field as a reference to the mobile station and is then able to transmit a differential field containing a modified antenna index to the mobile station.

Moreover, the base station is able to transmit a downlink control signal containing an updated differential field to the mobile station each time an antenna index is modified. In this case, even if a UL message is not received from the mobile station, in case of attempting to modify an antenna index, the base station is able to transmit a downlink control signal containing an updated differential field to the mobile station.

In particular, although MCS (or CQI) information transmitted to the mobile station in performing OL antenna switching is damaged, the base station is able to apply a more accurate differential field to next CL antenna switching in a manner of transmitting a more accurate reference field to the mobile station one more time in case of performing CL antenna switching.

Figure 6:
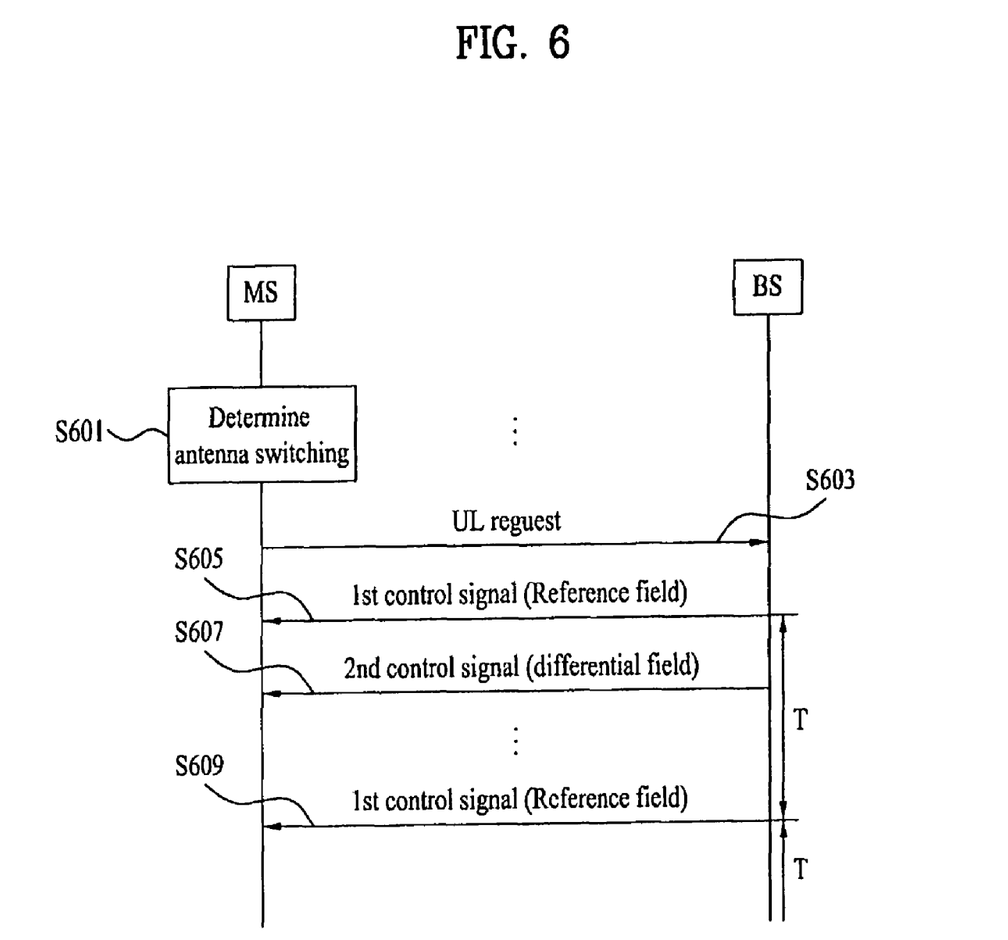
FIG. 6 is a diagram of one example for a method of transmitting an antenna index in antenna switching according to another embodiment of the present invention.

FIG. 6 is a diagram of one example for a method of transmitting an antenna index in antenna switching according to another embodiment of the present invention.

Referring to FIG. 6, a mobile station (MS) is able to determine whether to perform switching of an antenna based on a current channel environment and the like [S601].

If the mobile terminal (MS) needs to switch an antenna, the mobile station is able to transmit a UL request message for requesting an antenna switching to a base station (BS). In this case, the UL request message can include an antenna switching request for open-loop (OL) or closed-loop (CL) ASTD [S603].

When the base station performs CL antenna switching in the course of performing OL antenna switching, instead of transmitting a differential field to the mobile station directly, the base station transmits a reference field to the mobile station and is then able to transmit a differential field to the mobile station. Hence, the base station transmits a first control signal including the reference field to the mobile station [S605] and is then able to transmit a second control signal including the differential field to the mobile station [S607].

In this case, according to another embodiment of the present invention, while the CL antenna switching is being performed, the base station is able to inform the mobile station of reliable MCS information in a manner periodically transmitting the first control signal to the mobile station.

In FIG. 6, the reference field of the first control signal can include previous MCS level information and the differential field of the second control signal can include a selected antenna index and modified MCS level information. In case that the base station (BS) determines whether to perform the antenna switching, it is able to omit the steps S601 to S03.

Figure 7:
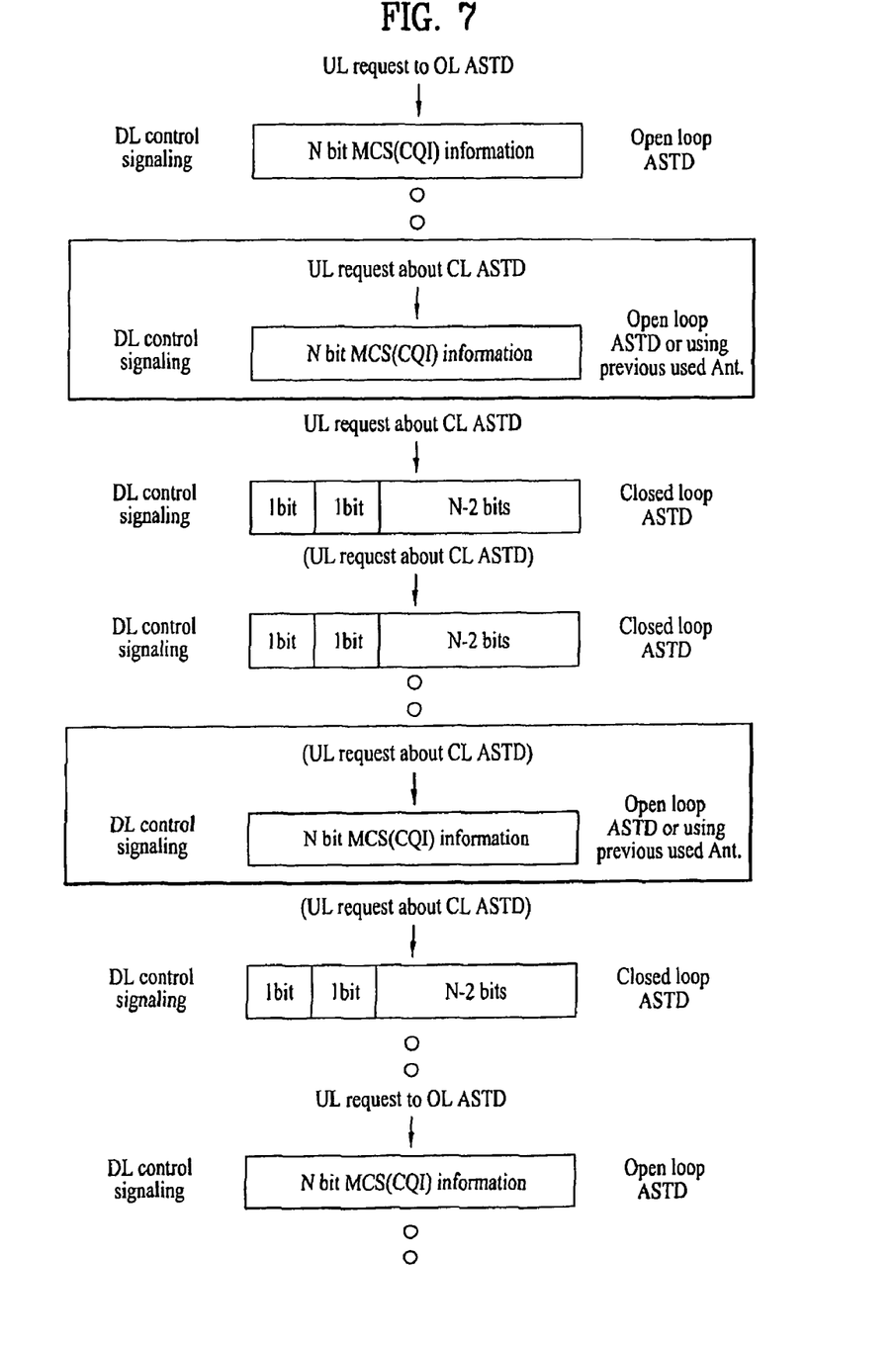
FIG. 7 is a diagram of one example for a method of transmitting a selected antenna index in antenna switching according to another embodiment of the present invention.

FIG. 7 is a diagram of one example for a method of transmitting a selected antenna index in antenna switching according to another embodiment of the present invention.

FIG. 7 shows an embodiment for the method described with reference to FIG. 6. A mobile station makes a request for antenna switching via an uplink request message (UL request to OL ASTD). A base station is able to transmit a selected antenna index and MCS level information to the mobile station using a downlink control signal.

In this case, since there is no antenna index information in transmitting the uplink request message, the mobile station is able to apply OL antenna switching and is also able to use a previously used antenna as it is.

Referring to FIG. 7, in performing CL antenna switching, a base station transmits a DL control signal including a reference field and then transmits a DL control signal including a differential field, instead of transmitting the DL control signal including the differential field. Yet, while the CL antenna switching is being performed, the base station is able to periodically transmit the DL control signal including the reference field to the mobile station.

The period for transmitting the reference field is applicable in various ways according to performance of a system. A period value is set to an integer value in a simple manner or can be set by event triggering. The reference field can contain MCS information or CQI information, and the differential field can contain selected antenna index information, information on a presence or non-presence of increment/decrement of MCS level and incremented/decremented offset information of the MCS level. Therefore, the mobile station is able to perform the CL antenna switching using the informations contained in the differential field.

Besides the MCS (CQI) field described with reference to FIG. 7, it is able to apply the embodiments of the present invention to a field included in another DL control signal.

Figure 8:
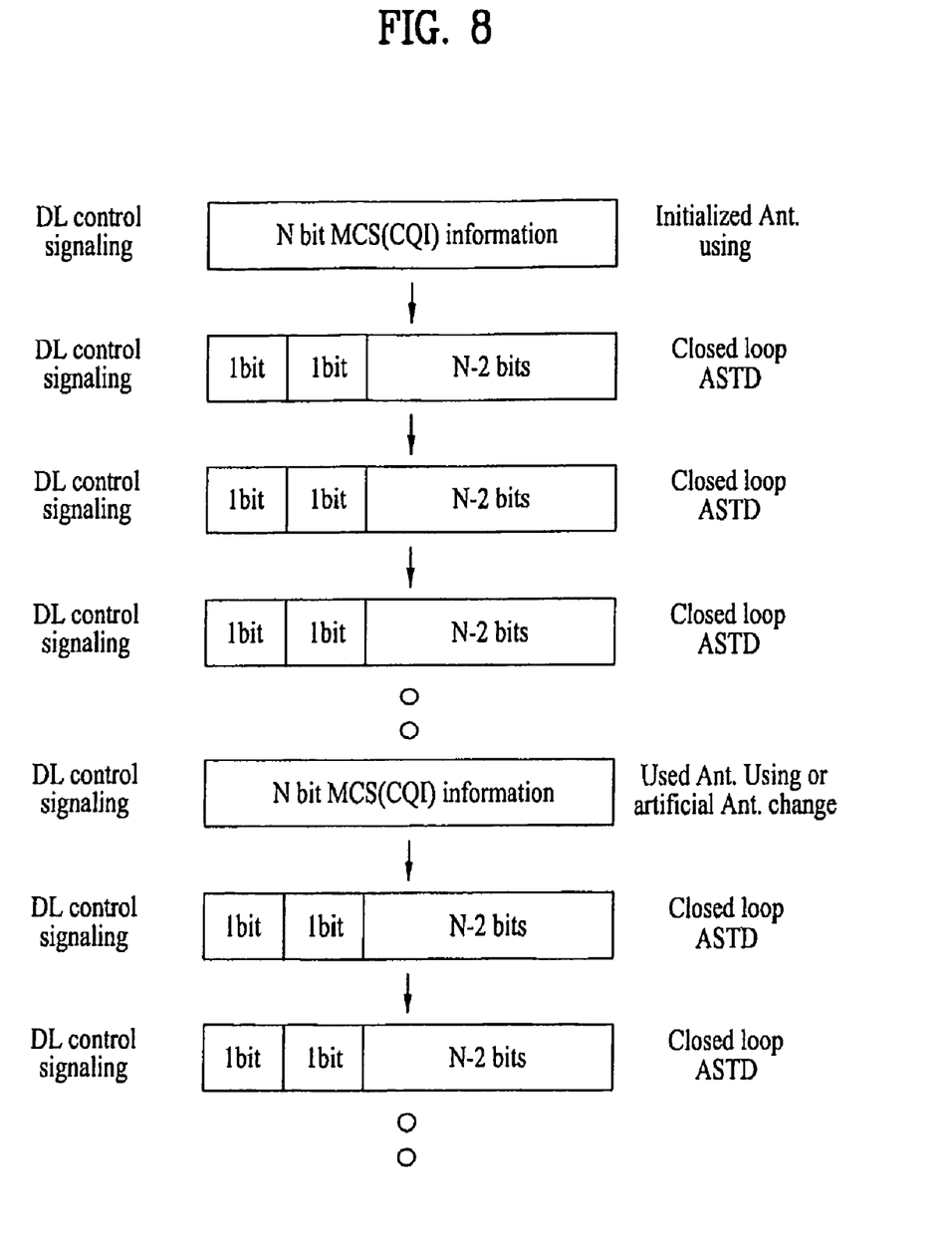
FIG. 8 is a diagram for an antenna index method in a CL antenna switching system by utilizing a DL control signal.

FIG. 8 is a diagram for an antenna index method in a CL antenna switching system by utilizing a DL control signal.

FIG. 8 shows a structure for an antenna index transmitting method in a CL antenna switching system instead of an adaptive antenna switching structure of OL/CL. A base station is able to periodically transmit a reference field to a mobile station using a DL control signal. The base station is able to transmit an antenna switching index to the mobile station in a manner of transmitting a differential field to the mobile station in the course of transmitting the reference field.

In the embodiments of the present invention, it is assumed that 1 bit is used as a bit for indicating a selected antenna index. This is usable for a case that two transmitting antennas exist. Yet, according o a channel environment or a user's request, if there are four transmitting antennas, it is able to represent a selected antenna index using two bits or more.

In case that a reference field is transmitted to a mobile station, a base station is able to use a preset antenna or randomly changes the antenna to another antenna to use. The present invention is usable as a structure for transmitting a reference signal periodically or a structure for transmitting a reference signal by event triggering according to a request made by a mobile station.

Industrial Applicability

Accordingly, embodiments of the present invention are applicable to various wireless access systems. For example, the various wireless access systems include 3GPP ($3^{rd}$ generation partnership project) system, 3GPP2 system, IEEE (institute of electrical and electronic engineers) 802.xx system and the like. The embodiments of the present invention are applicable to all applied technical fields of the various wireless access systems as well as the above-mentioned various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting antenna information, comprising the steps of:
   receiving an uplink request message for closed-loop antenna switching from a mobile station;
   transmitting a reference field including prescribed modulation and coding scheme (MCS) information to the mobile station; and
   transmitting a differential field including the antenna information to the mobile station,
   wherein the antenna information contains a selected antenna index.

2. The method of claim 1, wherein the reference field is transmitted before the differential field is transmitted.

3. The method of claim 2, wherein the reference field includes modulation and coding scheme (MCS) information in case of using open-loop antenna switching and wherein the differential field includes a field indicating a presence or non-presence of increment/decrement of the MCS information and an offset value for increment/decrement of the MCS level.

4. The method of claim 3, wherein the reference field is periodically transmitted.

5. The method of claim 2, wherein the antenna information contains the selected antenna index.

6. The method of claim 2, wherein the differential field is transmitted each time the MCS information is updated.

7. A method of receiving antenna information, comprising the steps of:
   transmitting an uplink request message for closed-loop antenna switching to a base station;
   receiving a reference field including prescribed modulation and coding scheme (MCS) information from the base station; and
   receiving a differential field including the antenna information from the base station,
   wherein the antenna information contains a selected antenna index.

8. The method of claim 7, wherein the reference field is transmitted before the differential field is transmitted.

9. The method of claim 8, wherein:
   the reference field includes modulation and coding scheme (MCS) information in case of using open-loop antenna switching, and
   the differential field includes a field indicating a presence or non-presence of increment/decrement of the MCS information and an offset value for increment/decrement of the MCS level.

10. The method of claim 9, wherein the reference field is periodically transmitted.

11. The method of claim 8, wherein the antenna information contains the selected antenna index.

12. The method of claim 8, wherein the differential field is transmitted each time the MCS information is updated.

* * * * *